(12) United States Patent
Nagarkar et al.

(10) Patent No.: US 10,514,988 B2
(45) Date of Patent: Dec. 24, 2019

(54) METHOD AND SYSTEM OF MIGRATING APPLICATIONS TO A CLOUD-COMPUTING ENVIRONMENT

(71) Applicants: Kuldeep Nagarkar, Pune (IN); Ashish Khurange, Pune (IN); Sachin Durge, Pune (IN); Dhiraj Akude, Pune (IN); Supriya Sitaram Dere, Pune (IN); Ravender Goyal, Saratoga, CA (US)

(72) Inventors: Kuldeep Nagarkar, Pune (IN); Ashish Khurange, Pune (IN); Sachin Durge, Pune (IN); Dhiraj Akude, Pune (IN); Supriya Sitaram Dere, Pune (IN); Ravender Goyal, Saratoga, CA (US)

( * ) Notice: Subject to any disclaimer, the term of this patent is extended or adjusted under 35 U.S.C. 154(b) by 502 days.

(21) Appl. No.: 15/051,050

(22) Filed: Feb. 23, 2016

(65) Prior Publication Data

US 2017/0147447 A1 May 25, 2017

Related U.S. Application Data

(60) Provisional application No. 62/257,716, filed on Nov. 19, 2015.

(51) Int. Cl.
| | |
|---|---|
| *G06F 7/02* | (2006.01) |
| *G06F 16/00* | (2019.01) |
| *G06F 11/14* | (2006.01) |
| *G06F 9/4401* | (2018.01) |
| *G06F 16/27* | (2019.01) |
| *G06F 16/174* | (2019.01) |
| *G06F 9/455* | (2018.01) |

(52) U.S. Cl.
CPC ........ *G06F 11/1453* (2013.01); *G06F 9/4416* (2013.01); *G06F 9/45558* (2013.01); *G06F 11/1464* (2013.01); *G06F 16/1752* (2019.01); *G06F 16/27* (2019.01); *G06F 9/4408* (2013.01); *G06F 2009/45575* (2013.01)

(58) Field of Classification Search
CPC ................. G06F 9/4416; G06F 9/4401; G06F 17/30159; G06F 11/1453; G06F 17/30283; G06F 16/1752; G06F 16/27
See application file for complete search history.

(56) References Cited

U.S. PATENT DOCUMENTS

| | | | | |
|---|---|---|---|---|
| 9,652,263 B2* | 5/2017 | Graf | ..................... | G06F 9/44505 |
| 9,971,618 B2* | 5/2018 | Lagergren | ............. | G06F 9/5077 |
| 2012/0173689 A1* | 7/2012 | Yang | ..................... | H04L 41/042 |
| | | | | 709/223 |
| 2013/0290542 A1* | 10/2013 | Watt | ........................ | H04L 51/22 |
| | | | | 709/226 |
| 2014/0122860 A1* | 5/2014 | Jai | ........................ | G06F 9/4416 |
| | | | | 713/2 |
| 2016/0078068 A1* | 3/2016 | Agrawal | ........... | G06F 17/30303 |
| | | | | 707/692 |

* cited by examiner

*Primary Examiner* — Bruce M Moser (57) ABSTRACT

In one embodiment, a computer-implemented method for server migration includes the step of providing an onsite system that comprises a server. A storage appliance is provided. The storage appliance is coupled with the onsite system. A bootable server image is created. The bootable server image is stored on the storage appliance. The bootable server image is migrated to a cloud-computing environment using the storage appliance. A version of the bootable server image is generated in the cloud-computing environment.

7 Claims, 9 Drawing Sheets

METHOD AND SYSTEM OF MIGRATING APPLICATIONS TO A CLOUD-COMPUTING ENVIRONMENT

CROSS-REFERENCE TO RELATED APPLICATIONS

This application is a claims priority from provisional U.S. Application No. 62/257,716 filed 19 Nov. 2015. This application is hereby incorporated by reference in its entirety.

FIELD OF THE INVENTION

This application relates generally to data storage, and more specifically to a system, article of manufacture and method of migrating applications to a cloud-computing environment.

DESCRIPTION OF THE RELATED ART

An enterprise may wish to implement the copying and archiving of computer data so it may be used to restore the original after a data loss event. For example, the enterprise may wish to migrate servers and the server data to a cloud-computing environment. Current methods may lack functionalities that enable the migration of servers to a cloud-computing environment. Many current methods can only be used to migrate archived data in the form of files. Accordingly, improvements to migrating applications to a cloud-computing environment can be implemented.

BRIEF SUMMARY OF THE INVENTION

In one aspect, a computer-implemented method for server migration includes the step of providing an onsite system that comprises a server. A storage appliance is provided. The storage appliance is coupled with the onsite system. A bootable server image is created. The bootable server image is stored on the storage appliance. The bootable server image is migrated to a cloud-computing environment using the storage appliance. A version of the bootable server image is generated in the cloud-computing environment.

Optionally, an incremental change occurring during the migration of the bootable server image can be provided to a cloud-computing environment. The incremental data can be deduped into a set of deduped data chunks managed by a deduplication database. The deduplication database can include a list of the set of deduped data chunks and the set of deduped data chunks. The list of the set of deduped data chunks can be stored in a local cache storage of the onsite system.

In another aspect, a method of migrating applications to a cloud-computing environment includes the steps of: attaching a deduplication database to a dedupe data chunk storage of a bootable server image; detaching the dedupe chunk storage from the deduplication database; migrating the dedupe chunk storage to a cloud-computing environment; tracking, with the deduplication database, a data change that occurs during the migration of the dedupe chunk storage; and associating the bootable server image with a dedupe metadata in the cloud computing environment.

BRIEF DESCRIPTION OF THE DRAWINGS

FIGS. 1 A-B illustrate an example process for migrating applications to a cloud-computing environment, according to some embodiments.

The Figures described above are a representative set, and are not exhaustive with respect to embodying the invention.

DESCRIPTION

Disclosed are a system, method, and article of manufacture for migrating applications to a cloud-computing environment. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

Backup image (or image) can include copies of programs, system settings, files, etc. It can be a complete system backup that can be used for restore operations.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Data deduplication (e.g. 'dedupe', 'deduplication') can refer to the elimination of redundant data.

Dedupe storage network can be represented in the form of a graph topology, where node represents dedupe storage node, and the directed edge represent the data replication path. In dedupe storage network data is replicated in dedupe preserving manner. A data chunk which is present at a dedupe storage node is never replicated to that same storage node by any other storage node in the dedupe storage network.

Fingerprint can uniquely identify data.

Wide area network (WAN) can be a telecommunications network or computer network that extends over a large geographical distance.

Additional example definitions are provided herein.

Example Methods

In some embodiments, rather than directly migrating servers from an onsite system to a cloud-computing environment, staging can be performed on onsite application where bootable server images (BSI) will be stored and then move storage appliance from onsite to the cloud. The BSIs can then be ported to the cloud-computing environment. Incremental changes at the onsite server can be synchronized between the onsite system and the cloud-computing environment.

In some embodiments, an onsite appliance (e.g. a data-transfer box, etc.) can create a bootable image a server (and/or another application). The onsite appliance can test the bootability of the capture server image then transfer the storage appliance from the onsite system to the cloud-computing environment. Any incremental changes that occurred during migration process can be created and maintained in the onsite cache storage. Incremental changes can be transferred to cloud-computing environment over a WAN to optimize WAN usage.

In first full capture, capture BSI's in dedupe store, verify the captured BSI's by verifying them on the dedupe store, then remove the dedupe store from onsite, then attach the dedupe store to the cloud. In between these steps, the method can continue to capture the incremental changes that are occurring to the local server inside an onsite cache storage.

It is noted that a dedupe store can include a dedupe database. The dedupe database can capture and maintain a list of unique dedupe chunks that are available on the dedupe store. The dedupe store can also include the dedupe chunks. When migrating a dedupe store from an onsite system to a cloud-computing environment, just the dedupe chunks are migrated to the cloud-computing environment. The list of unique dedupe chunks that are available in the dedupe database can still be maintained on the onsite system. For example, after dedupe store is moved to the cloud-computing environment, the onsite appliance can contain only the database portion that lists all the unique chunks which were on the onsite appliance earlier.

After the dedupe store is detached from the onsite, each time an incremental BSI is captured, the method can create the server image and inject the dedupe data into the onsite cache store. The cache store is provided for capturing the incremental changes to the server images till those images are available in the cloud environment. An onsite cache store for each dedupe chunk can check whether the dedupe chunk is present in dedupe database. If it is, then it can be assumed that the chunk is already replicated to the cloud-computing environment. Accordingly, each onsite appliance need not store a dedupe chunk on a local disk because the dedupe chunk is already present in the cloud-computing environment. Only chunks not on list of dedupe database are stored on local appliance. This can minimize the incremental portions of the server image that are to be migrated. In this way, the method can migrate incremental changes that occur to server during the migration process and transfer changes to server over the WAN. These changes can be automatically synchronized to server image created in the cloud-computing environment.

Figure 1A:
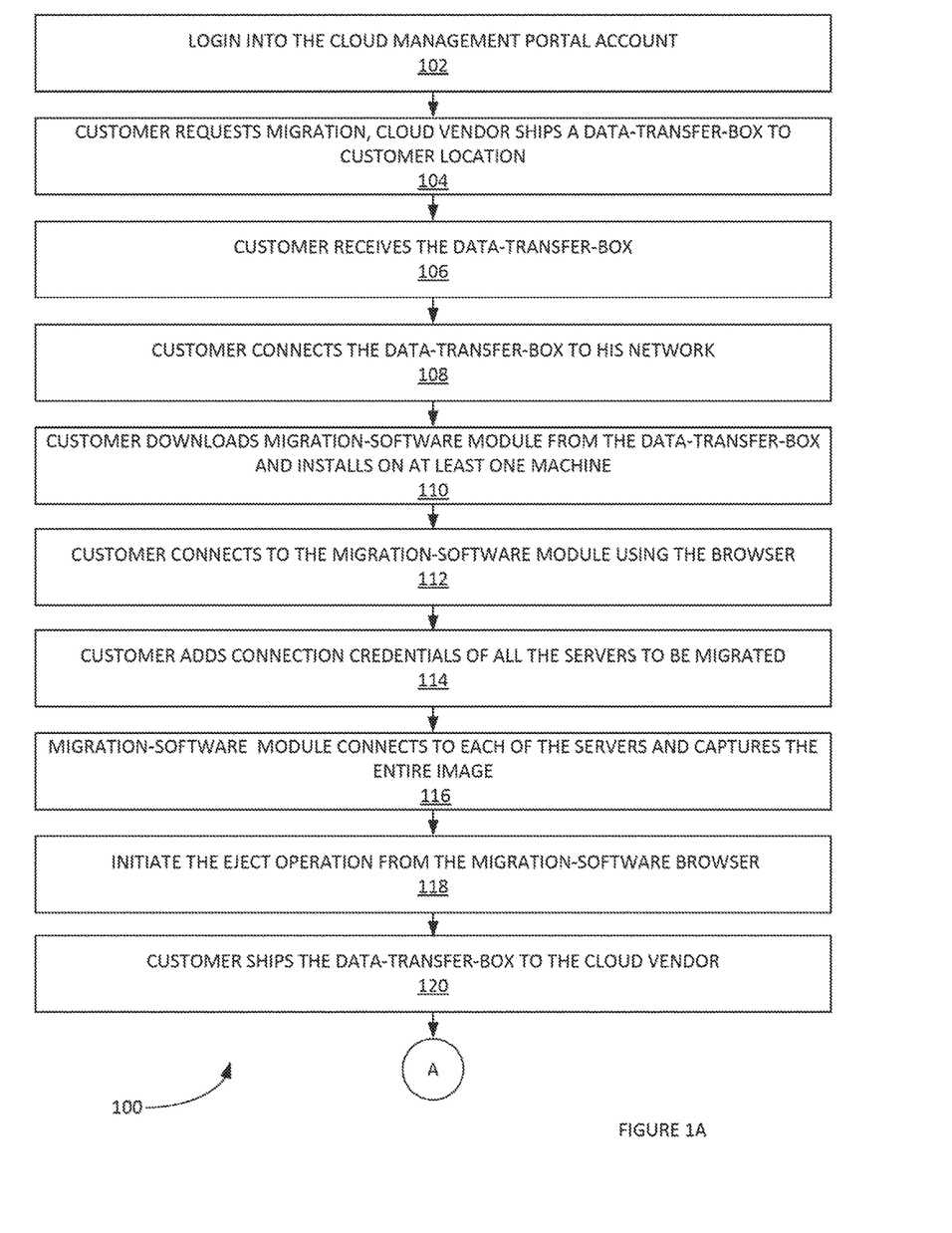
Figure 1B:
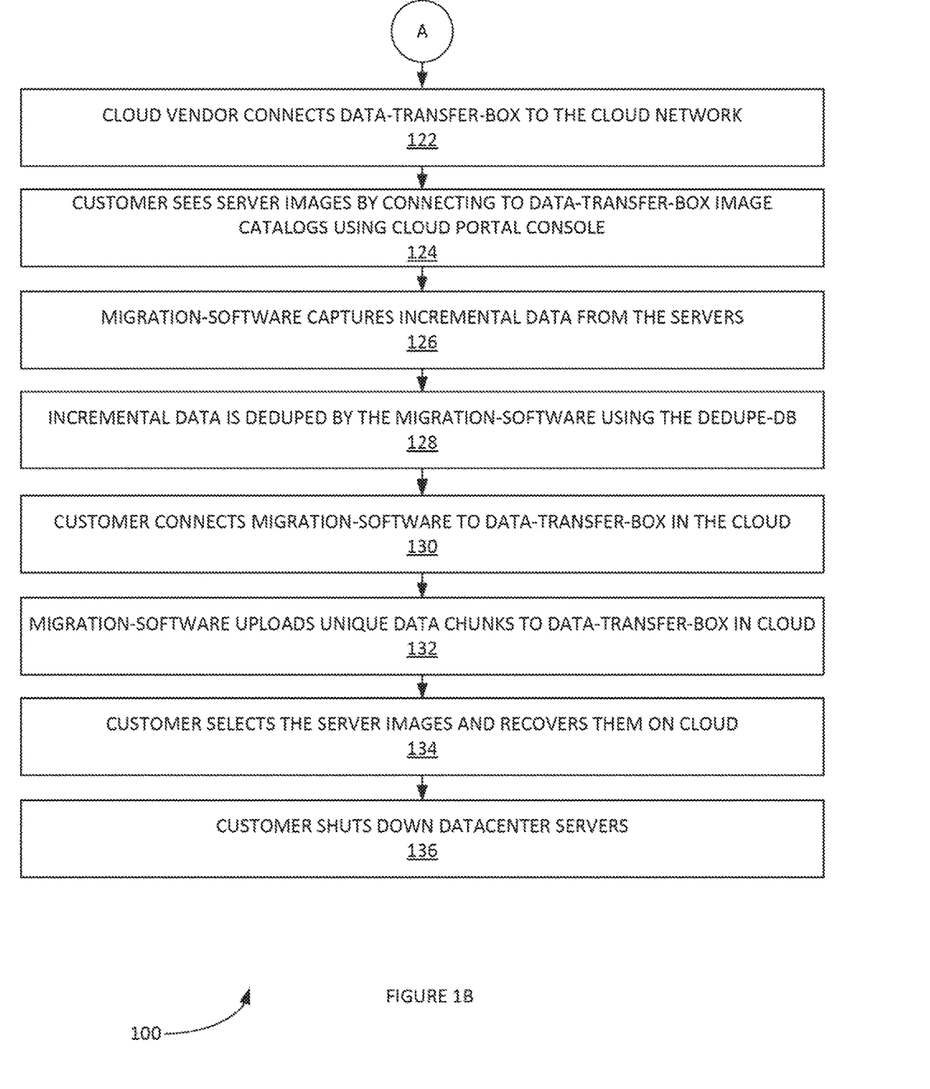

FIGS. 1 A-B illustrate an example process 100 for migrating applications to a cloud-computing environment, according to some embodiments. In step 102, a customer can login into the cloud-management portal account.

In step 104, a customer can request migration and a cloud vendor can ship a Data-Transfer-Box to the customer's location. A Data-Transfer-Box can provide an Import/Export service. In one example, step 104 can import hundreds of terabytes or petabytes of data from an on-premises data centers into a specified cloud storage service. Step 104 can use an appliance such as the Data-Transfer Box to provide simple interfaces. The appliance can be used to create import jobs, transfer data, and/or track the status of jobs through to completion. A Data-Transfer-Box can be a storage box.

In step 106, a customer can receive the Data-Transfer-Box. In step 108, the customer can connect the Data-Transfer-Box to the customer's computer network (e.g. a customer machine, etc.).

Figure 2:
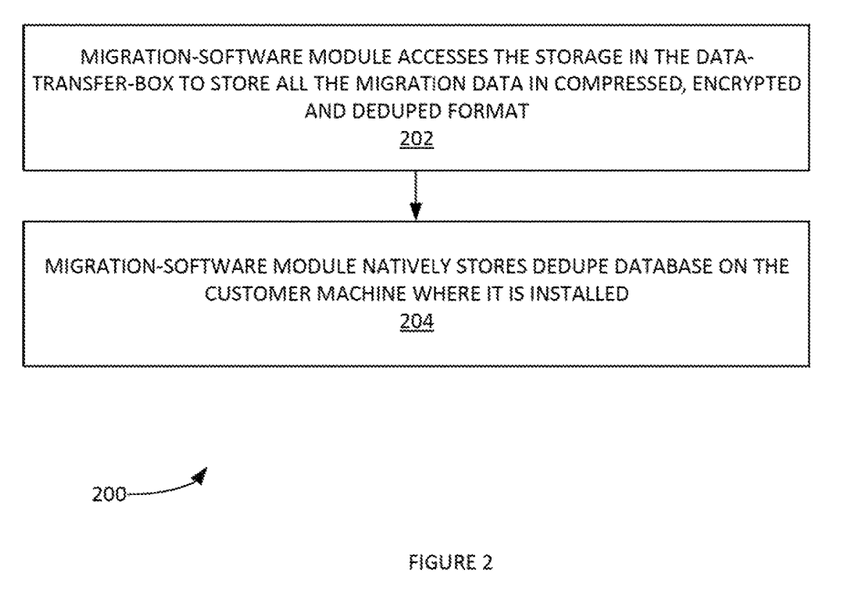
FIG. 2 illustrates an example process of implementing step 110, according to some embodiments.

In step 110, a customer can download a software module (e.g. a Migration-Software module) from the Data-Transfer-Box. This can be installed on one a customer machines. FIG. 2 illustrates an example process 200 of implementing step 110, according to some embodiments. In step 202, the Migration-Software module can access the storage in the Data-Transfer-Box to store all the migration data in compressed, encrypted and deduped format. In step 204, the Migration-Software module can natively store dedupe database on the customer machine where it is installed.

Returning to process 100, in step 112, a customer can connect to the Migration-Software module using a browser. In step 114, a customer can add the connection credentials of the servers to be migrated.

Figure 3:
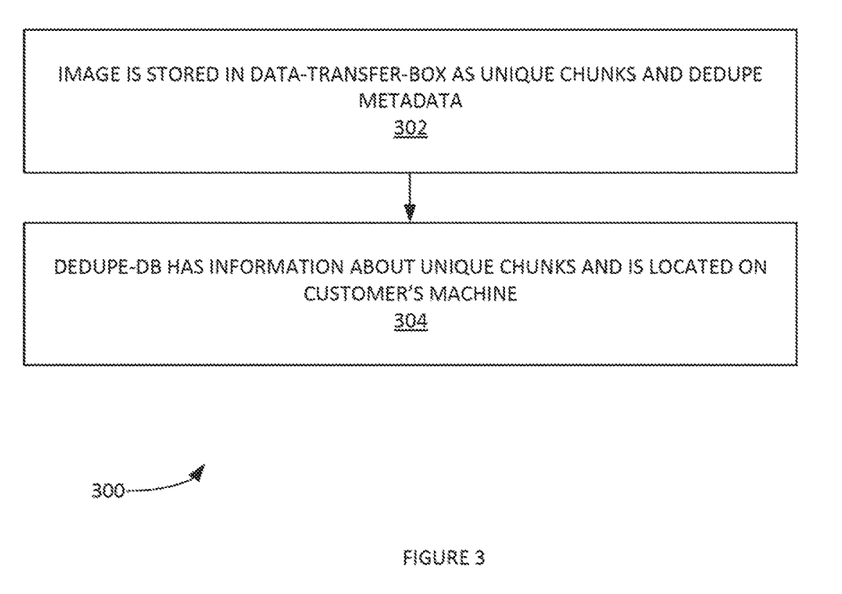
FIG. 3 illustrates an example process for implementing step 116, according to some embodiments.

In step 116, the Migration-Software module can connect to each of the servers and captures the entire image. FIG. 3 illustrates an example process 300 for implementing step 116, according to some embodiments. In step 302, the image can be stored in Data-Transfer-Box as unique chunks and dedupe metadata. In step 304, the Dedupe-DB can have the information about unique chunks and is located on the customer's machine.

Figure 4:
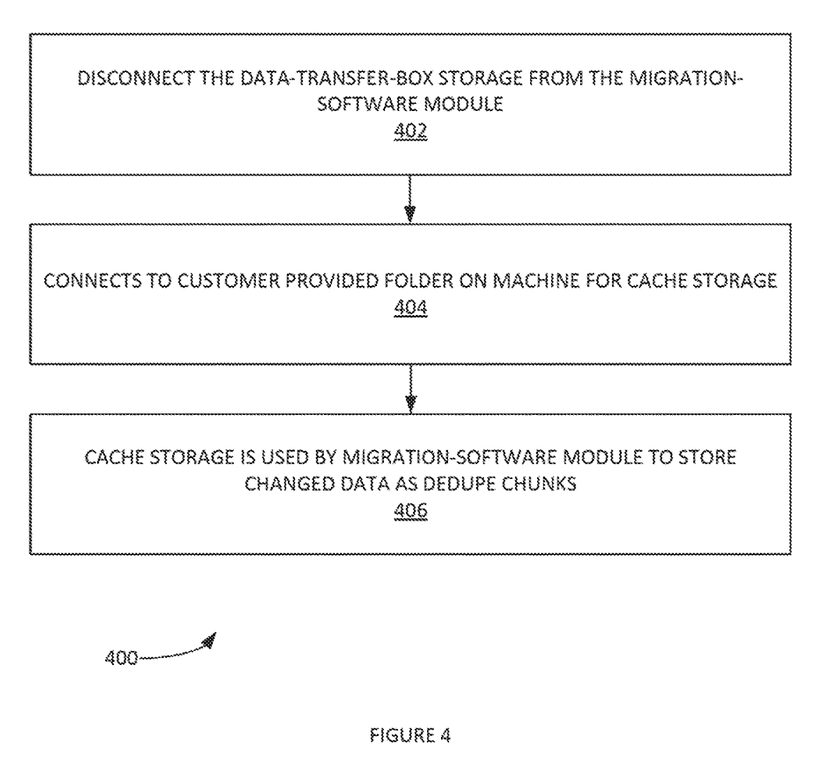
FIG. 4 illustrates an example process for implementing step 118, according to some embodiments.

In step 118, once the server images are captured and/or when the Data-Transfer-Box is full, process 100 can initiate the eject operation from the Migration-Software module browser. FIG. 4 illustrates an example process 400 for implementing step 118, according to some embodiments. An example eject operation is as followed. In step 402, process 400 can disconnect the Data-Transfer-Box storage from the Migration-Software module. In step 404, process 400 can connect to a customer provided folder on the machine for cache storage. In step 406, the cache storage can be used by Migration-Software module to store changed data as dedupe chunks.

Returning to process 100, in step 120, a customer can ship the Data-Transfer-Box to the cloud vendor. In step 122, on receiving the Data-Transfer-Box, the cloud vendor can connect it to the cloud network. In step 124, the customer can see the server images by connecting to the Data-Transfer-Box image catalogs using the cloud portal console. In step 126, while the Data-Transfer-Box is in transit to the cloud, the Migration-Software module can capture the incremental data from the servers.

Figure 5:
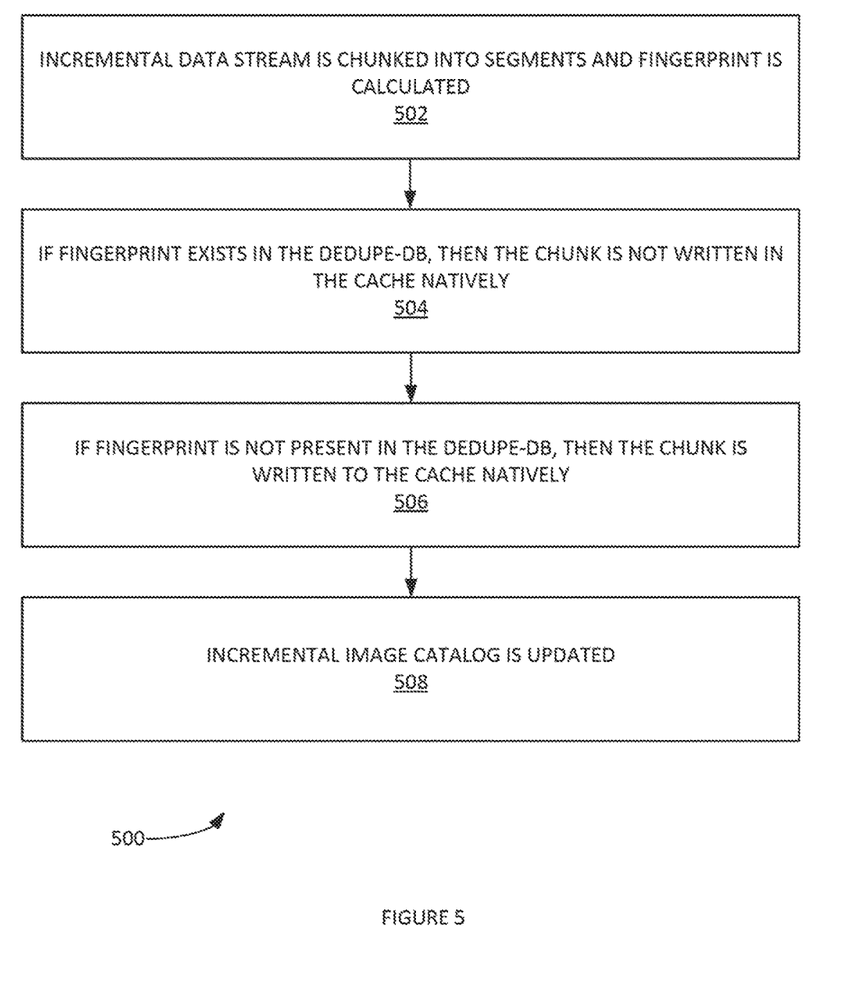
FIG. 5 illustrates an example process for implementing step 128, according to some embodiments.

In step 128, the incremental data can be deduped by the Migration-Software module using the Dedupe-DB. FIG. 5 illustrates an example process 500 for implementing step 128, according to some embodiments. In step 502, the incremental data stream can be chunked into segments and fingerprint is calculated. In step 504, if a fingerprint exists in the Dedupe-DB, then the chunk is not written in the cache natively. In step 506, if fingerprint is not present in the Dedupe-DB, then the chunk is written to the cache natively. In step 508, the incremental image catalog can be updated. Accordingly, the unique data chunks are stored in the cache. Returning to process 100, in step 130, the customer can connect the Migration-Software module to the Data-Transfer-Box in the cloud.

Figure 6:
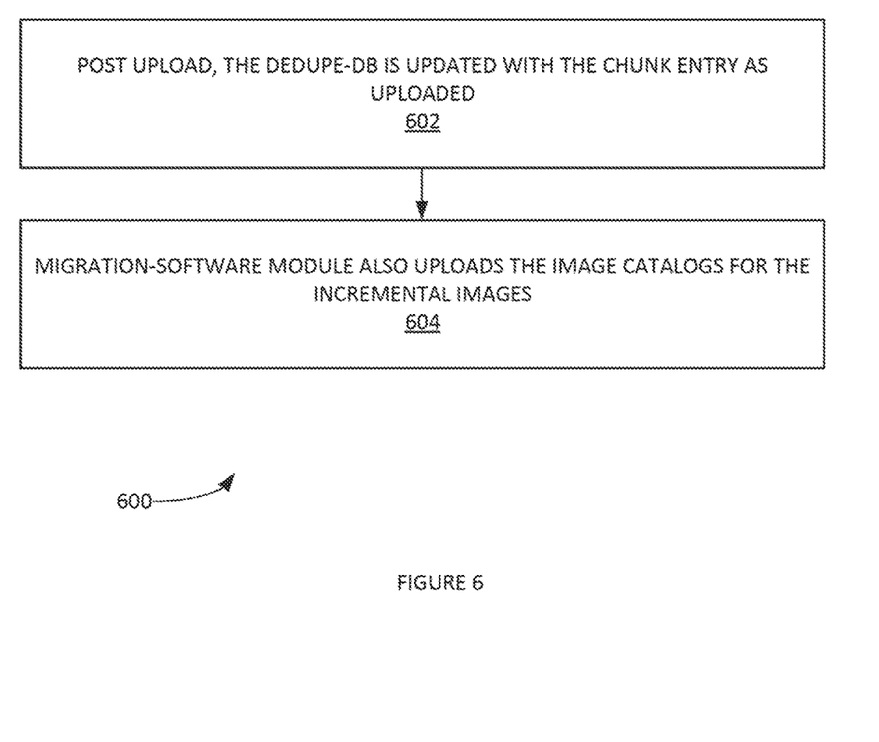
FIG. 6 illustrates an example process for implementing step 132, according to some embodiments.

In step 132, the Migration-Software module can upload the unique data chunks to the Data-Transfer-Box in the cloud. FIG. 6 illustrates an example process 600 for implementing step 132, according to some embodiments. In step 602, process 600 can post upload, the Dedupe-DB is updated with the chunk entry as uploaded. In step 604, the Migration-Software module can also upload the image catalogs for the incremental images. Accordingly, the server images in the cloud can be synchronized with the servers running in customer datacenter.

Returning to process 100, in step 134, the customer can select the server images and recover them on cloud. In step 136, the customer shutdown the datacenter servers.

Figure 7:
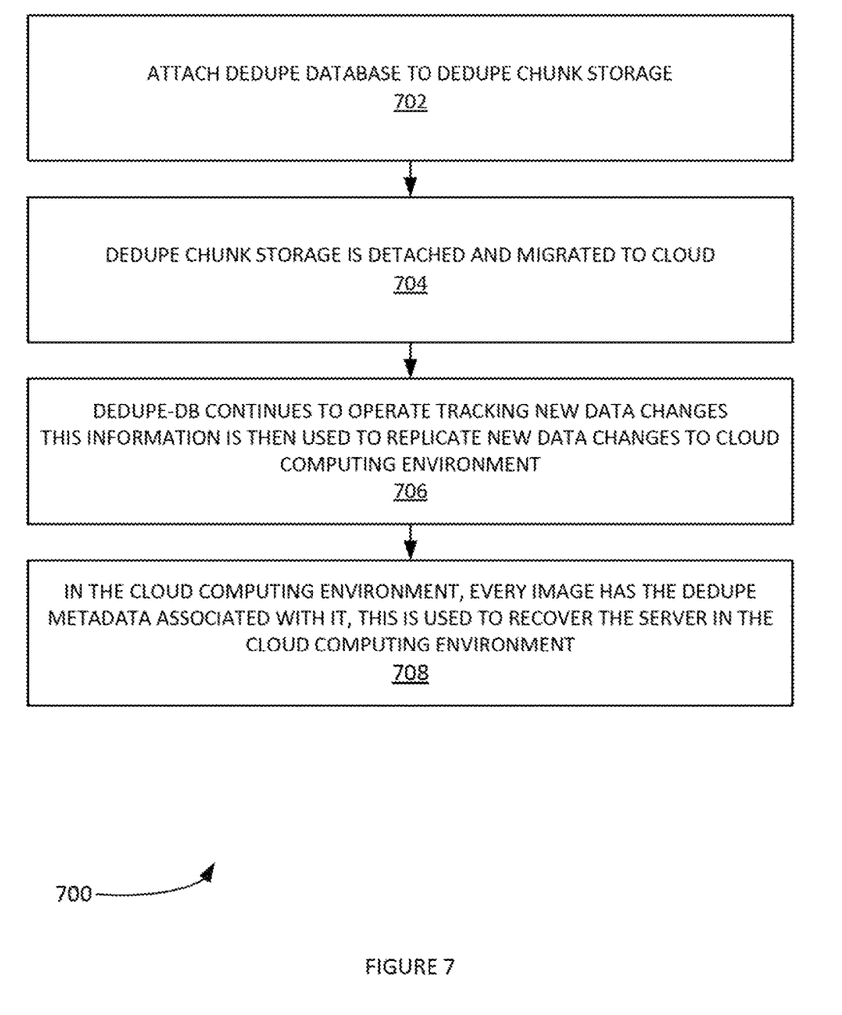
FIG. 7 illustrates an example process of migrating applications to a cloud-computing environment, according to some embodiments.

FIG. 7 illustrates an example process 700 of migrating applications to a cloud-computing environment, according to some embodiments. In step 702, process 700 attaches a Dedupe database to dedupe chunk storage. In step 704, process 700 the dedupe chunk storage is detached and migrated to cloud. In step 706, the Dedupe database continues to operate tracking new data changes. Process 700 uses this information to replicate new data changes to cloud computing environment. In step 708, in the cloud computing environment, every image has the dedupe metadata associated with it by process 700. Process 700 then uses this information to recover the server in the cloud computing environment.

Exemplary Computer Architecture and Systems

Figure 8:
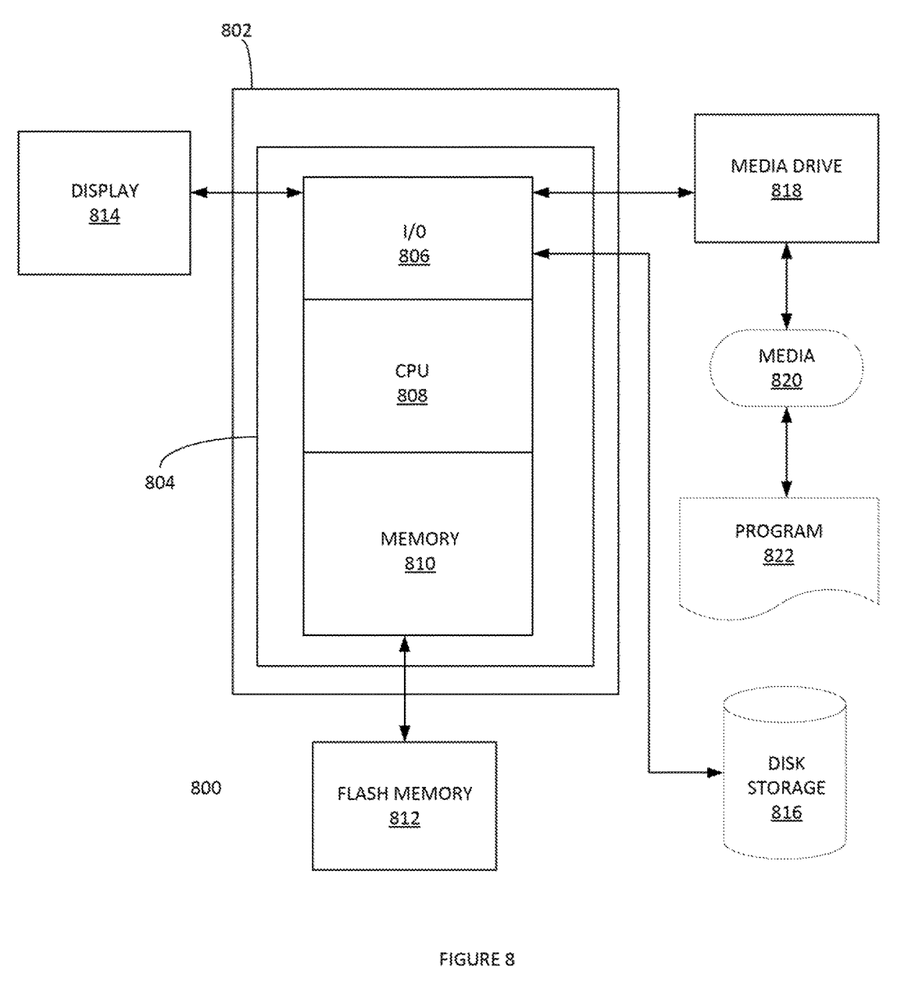
FIG. 8 depicts an exemplary computing system that can be configured to perform any one of the processes provided herein.

FIG. 8 depicts an exemplary computing system 800 that can be configured to perform any one of the processes provided herein. In this context, computing system 800 may include, for example, a processor, memory, storage, and I/O devices (e.g., monitor, keyboard, disk drive, Internet connection, etc.). However, computing system 800 may include circuitry or other specialized hardware for carrying out some or all aspects of the processes. In some operational settings, computing system 800 may be configured as a system that includes one or more units, each of which is configured to carry out some aspects of the processes either in software, hardware, or some combination thereof.

FIG. 8 depicts computing system 800 with a number of components that may be used to perform any of the processes described herein. The main system 802 includes a motherboard 804 having an I/O section 806, one or more central processing units (CPU) 808, and a memory section 810, which may have a flash memory card 812 related to it. The I/O section 806 can be connected to a display 814, a keyboard and/or other user input (not shown), a disk storage unit 816, and a media drive unit 818. The media drive unit 818 can read/write a computer-readable medium 820, which can contain programs 822 and/or data. Computing system 800 can include a web browser. Moreover, it is noted that computing system 800 can be configured to include additional systems in order to fulfill various functionalities. Computing system 800 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an Illustrative rather than a restrictive sense. In some embodiments, the machine-readable medium can be a non-transitory form of machine-readable medium.

What is claimed as new and desired to be protected by Letters Patent of the United States is:

1. A computer-implemented method for server migration comprising:

provoiding an onsite system that comprises a server;
providing a storage appliance;
coupling the storage appliance with the onsite system;
creating a bootable server image;
storing the bootable server image on the storage appliance;
migrating the bootable server image to a cloud-computing environment using the storage appliance;
generating a version of the bootable server image in the cloud-computing environment; and
providing an incremental change occurring during the migration of the bootable server image to a cloud-computing environment; and
wherein an incremental data is deduped into a set of deduped data chunks managed by a deduplication database, wherein the bootable server image is associated with a dedupe metadata in the cloud computing environment and wherein the set of deduped data chunks is replicated and stored in the cloud-computing environment.

2. The computer-implemented method of claim 1, wherein the deduplication database comprises a list of the set of deduped data chunks and the set of deduped data chunks.

3. The computer-implemented method of claim 2, wherein the list of the set of deduped data chunks is stored in a local cache storage of the onsite system.

4. A method of migrating applications to a cloud-computing environment comprising:

attaching a deduplication database to a dedupe data chunk storage of a bootable server image;
detaching the dedupe chunk storage from the deduplication database;
migrating the dedupe chunk storage to a cloud-computing environment;
tracking, with the deduplication database, a data change that occurs during the migration of the dedupe chunk storage; and
associating the bootable server image with a dedupe metadata in the cloud computing environment.

5. The method of claim 4, wherein the bootable server image associated with the dedupe metadata in the cloud computing environment is utilized as a server recovery tool.

6. A computerized system for migrating applications to a cloud-computing environment comprising:

at least one processor configured to execute instructions;
at least one memory containing instructions when executed on the processor, causes the processor to perform operations that:
attach a deduplication database to a dedupe data chunk storage of a bootable server image;
detach the dedupe chunk storage from the deduplication database;
migrate the dedupe chunk storage to a cloud-computing environment;
track, with the deduplication database, a data change that occurs during the migration of the dedupe chunk storage; and
associate the bootable server image with a dedupe metadata in the cloud computing environment.

7. The system of claim 6, wherein the bootable server image associated with the dedupe metadata in the cloud computing environment is utilized as a server recovery tool.

* * * * *